Figure 1:
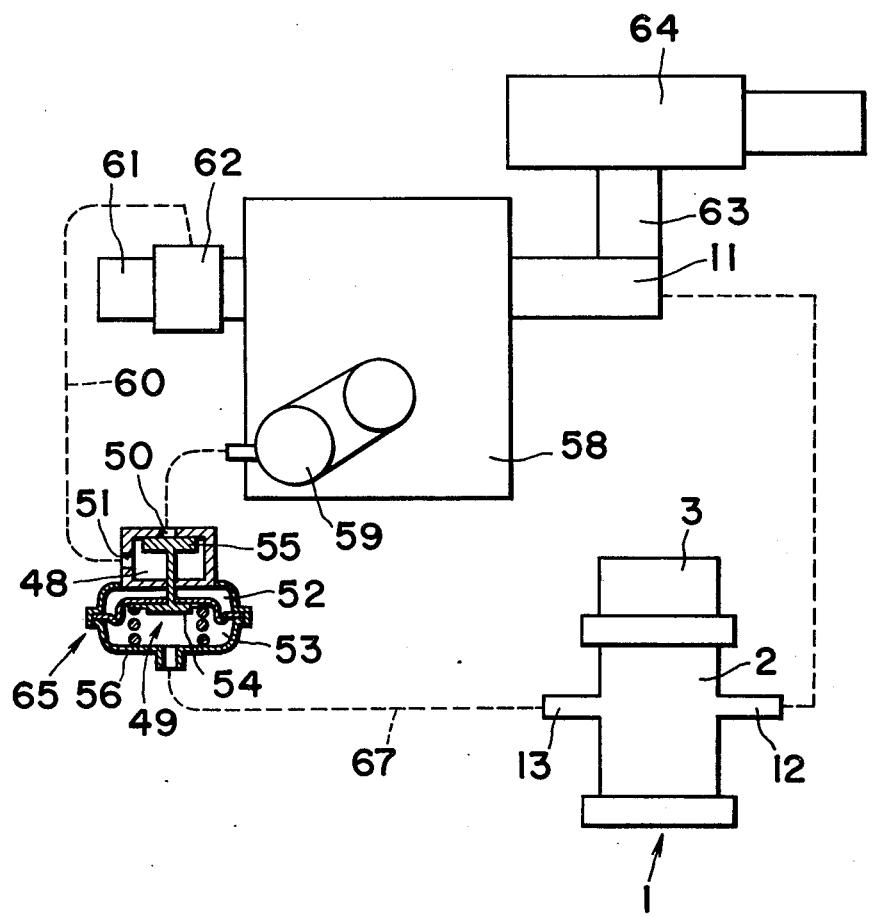

United States Patent [19]

Inada et al.

[11] 4,033,125
[45] July 5, 1977

[54] AIR FLOW CONTROL MEANS FOR AUTOMOBILE ENGINE EXHAUST GAS CLEANING MEANS

[75] Inventors: Masami Inada, Toyoake; Yasuhiro Kawabata; Katsujiro Sato, both of Toyota, all of Japan

[73] Assignees: Aisin Seiki Kabushiki Kaisha, Kariya; Toyota Jidosha Kogyo Kabushiki Kaisha, Toyota, both of Japan

[22] Filed: Sept. 18, 1975

[21] Appl. No.: 614,692

[30] Foreign Application Priority Data

Nov. 26, 1974 Japan .............. 49-136506

[52] U.S. Cl. .................. 60/290; 137/103; 137/627.5
[51] Int. Cl.² ........................... F01N 3/10
[58] Field of Search .......... 60/290; 137/627.5, 103; 123/97 B, 117 A, 119 A

[56] References Cited
UNITED STATES PATENTS

| | | | |
|---|---|---|---|
| 3,055,678 | 9/1962 | Alfieri | 137/627.5 |
| 3,461,908 | 8/1969 | Newcomb | 137/103 |
| 3,479,816 | 11/1969 | La Masters | 60/290 |
| 3,648,455 | 3/1972 | Muroko | 60/290 |
| 3,699,936 | 10/1972 | Vartanian | 123/117 A |
| 3,712,279 | 1/1973 | Vartanian | 123/117 A |
| 3,738,109 | 6/1973 | Tatsutomi | 60/290 |
| 3,768,452 | 10/1973 | Lewis | 123/97 B |
| 3,795,237 | 3/1974 | Denton | 123/97 B |
| 3,888,080 | 6/1975 | Nohira | 60/290 |
| 3,955,364 | 5/1976 | Lewis | 60/290 |
| 3,975,905 | 8/1976 | Shimo | 60/290 |

*Primary Examiner*—Douglas Hart
*Attorney, Agent, or Firm*—Finnegan, Henderson, Farabow & Garrett

[57] ABSTRACT

In an automobile engine exhaust gas cleaning system including an exhaust gas reactor which is supplied with auxiliary air for effecting combustion of unburnt constituents such as CO and HC in the exhaust gas, an air flow control device is provided for controlling the supply of the auxiliary air. The control device includes a first control valve disposed in the auxiliary air supply passage and controlled in response to the engine intake pressure so that it is opened when the engine intake vacuum is above the wide-open throttle vacuum, and a second control valve for controlling the supply of the engine intake vacuum to the first control valve in such a manner that it allows the engine intake vacuum to pass into the first control valve when the vacuum is lower than the value that is produced during deceleration and that it introduces atmospheric pressure to the first control valve when the vacuum increases to the value that is produced during deceleration. A time delay device is provided in the second control valve so that the atmospheric pressure to the first control valve is cut-off and the engine intake vacuum is again introduced into the first control valve after a certain time delay during initial period of engine deceleration.

2 Claims, 2 Drawing Figures

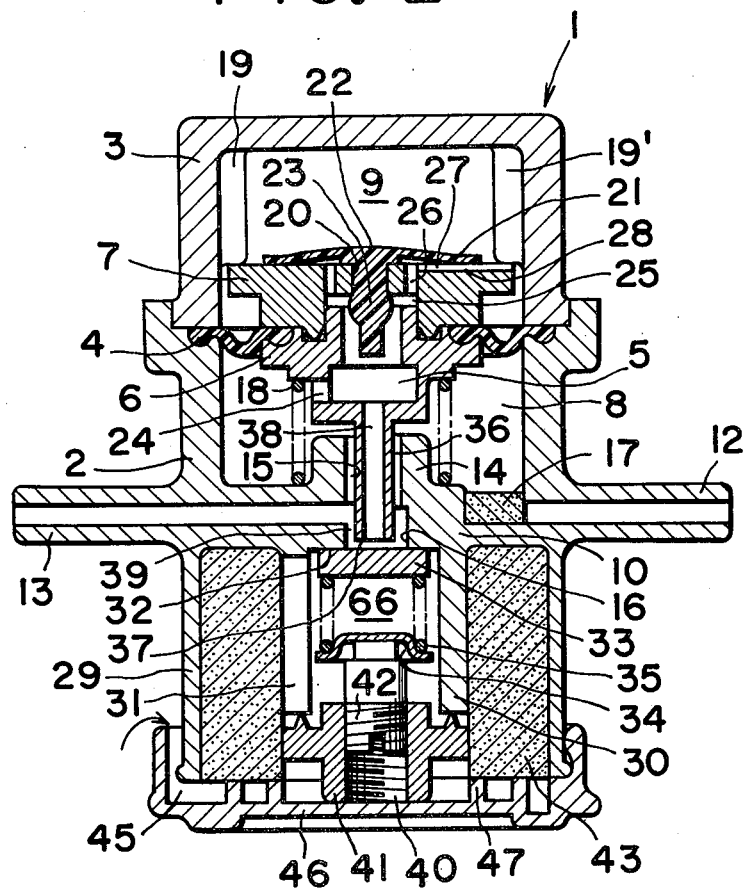

4,033,125

AIR FLOW CONTROL MEANS FOR AUTOMOBILE ENGINE EXHAUST GAS CLEANING MEANS

The present invention relates to exhaust gas cleaning means for automobile engines and more particularly to exhaust gas cleaning means of a type in which auxiliary air is delivered to engine exhaust system to supply additional oxygen for enabling combustion of unburnt constituents in the engine exhaust gas. More specifically, the present invention pertains to control means for the flow of auxiliary air in this type of exhaust gas cleaning means.

There has been an increasing problem of air pollution by automobile engine exhaust gas. Therefore, there has been a strong demand for eliminating or at least reducing emission of noxious constituents from automobile engines and various techniques have actually been developed. One of such techniques includes means for introducing auxiliary air into engine exhaust system to supply additional air for enabling oxidation of noxious constituents such as HC and CO in the exhaust gas. Prior art teaches to maintain a continuous supply of auxiliary air throughout the engine operation, however, it has been experienced that such a continuous supply of auxiliary air provides additional problems.

For example, when an engine is operated under a certain speed and the engine throttle valve is suddenly closed for deceleration, a abrupt increase of vacuum in an intake manifold causes an instantaneous vapourization of liquid fuel which has been deposited on the wall surface of engine intake passage, whereby an excessively fuel rich mixture is momentarily formed in the initial stage of deceleration. Therefore, there is a sudden increase in the amount of unburnt constituents such as HC and CO in the engine exhaust gas and these unburnt constituents are mixed in the engine exhaust system with the auxiliary air possibly resulting in an explosive combustion. This may cause an unpleasant feeling to an operator of the automobile and damage the engine exhaust system. During high speed, heavy load operation of the engine, the amounts of unburnt constituents in the engine exhaust gas are also increased and a similar problem is experienced.

In the U.S. Pat. No. 3,835,646 issued on Sept. 17, 1974 to Ernst L. Ranft et al., there is disclosed an air flow control unit for controlling the supply of the auxiliary air in such a manner that the supply is interrupted for a certain period during the initial period of rapid deceleration so as to eliminate the aforementioned problem. According to the teaching by the patent, the air flow control unit has a passage for supplying auxiliary air from an air pump to the exhaust pipe of the engine. The passage is provided with an air flow control valve which is responsive to the intake air vacuum of the engine to close the passage when the intake vacuum is increased during deceleration. A time delay device is provided in the air flow control valve so that it is re-opened a certain time after it is closed in response to the initiation of the engine deceleration.

The air flow control unit disclosed by the above patent is found as being effective to eliminate the aforementioned problem produced during rapid deceleration of the engine, however, the patent does not teach any solution for eliminating the problem produced during high speed, heavy load operation of the engine. The air flow control valve in the control unit of the patent is so constructed that it is closed by the difference between the engine intake vacuum and the atmospheric pressure, but the air intake vacuum is not increased during the high speed, heavy load operation of engine so that the air flow control unit continues the supply of auxiliary air in this mode of operation of the engine.

Therefore, the present invention has an object to provide exhaust gas cleaning means for automobile engines for effecting after-burning of unburnt constituents in engine exhaust gas through supply of auxiliary air to engine exhaust system, in which the supply of the auxiliary air is momentarily interrupted for a certain period during initial period of engine rapid deceleration and also the supply of the auxiliary air is interrupted throughout high speed and heavy load operation of the engine.

Another object of the present invention is to provide auxiliary air flow control means for automobile engine exhaust gas cleaning means, which functions to interrupt the supply of auxiliary air to the engine exhaust system for a certain time during initial period of engine rapid deceleration and also to interrupt the supply of auxiliary air throughout high speed, heavy load operation of the engine.

According to the present invention, the above and other objects can be accomplished, in automobile engine exhaust gas cleaning means which comprises an auxiliary air supply source for supplying auxiliary air through an auxiliary air passage means to the exhaust system of engine, by providing auxiliary air flow control means comprising first auxiliary air flow control valve means disposed in said auxiliary air passage means and including pressure-responsive means which is normally subjected to the engine intake vacuum for opening said valve means when the engine intake vacuum is above a predetermined value, and second air flow control valve means for controlling supply of said engine intake pressure to the pressure-responsive means in the first valve means, said second valve means including means responsive to the engine intake vacuum for interrupting the supply of said engine intake vacuum to the first control valve means for a certain time when the engine intake vacuum is increased above a second predetermined value.

In a preferred aspect of the present invention, the first auxiliary air flow control valve means includes a pressure-responsive diaphragm which is connected with a valve member in the valve means and normally subjected to the engine intake vacuum which is introduced through the second control valve means and serves to maintain the valve member in an open position. The diaphragm is spring-biased to a direction that the valve member is forced to a closed position, so that, when the engine throttle valve is fully opened for high speed and heavy load operation, the engine intake vacuum is decreased to such a value that the valve member is shifted to the closed position to interrupt the supply of auxiliary air to the engine exhaust system. The second control valve means may include a second pressure-responsive diaphragm which is secured to a valve-actuating member adapted to co-operate with a second valve member in the second control valve means. When the engine throttle valve is closed for deceleration, the engine intake vacuum is increased. Then, the second diaphragm is subjected to the increased vacuum and shifted to a position where the valve-actuating member engages the second valve member to force the latter to an open position in which the atmospheric pressure is introduced into the first control valve means to close the same. The second control valve means is provided with time delay means for returning the second diaphragm to normal position after a certain time delay so that the auxiliary air supply passage is again opened after such a time delay during rapid deceleration of the engine.

The above and other objects and features of the present invention will become apparent from the following descriptions of a preferred embodiment taking reference to the accompanying drawings, in which;

FIG. 1 is a diagrammatical illustration of an engine exhaust gas cleaning system including auxiliary air flow control means in accordance with one embodiment of the present invention; and, FIG. 2 is a sectional view of a second flow control valve in accordance with the present invention.

Referring now to the drawings, particularly to FIG. 1, there is diagrammatically shown an automobile engine 58 which has an intake manifold 11 and an exhaust passage 61. The engine intake manifold 11 is provided with a carburetor 63 which may be of a conventional type and connected with an air cleaner 64. The exhaust passage 61 is provided with an exhaust gas reactor 62 for effecting oxidation of unburnt constituents such as CO and HC in the exhaust gas from the engine 58.

In order to maintain a supply of auxiliary air necessitated for the oxidation of such unburnt constituents in the exhaust gas, there is provided an air pump 59 which is mounted on the engine 58 and continuously driven thereby. As shown in FIG. 1, the air pump 59 is connected through a first auxiliary air flow control valve 65 and an auxiliary air supply passage 60 with the exhaust gas reactor 62. The first air flow control valve 65 includes a valve housing having therein a valve chamber 48 which is connected through an inlet port 50 with the outlet port of the air pump 59 and also through an outlet port 51 with the passage 60. The first air flow control valve 65 further includes a pressure-responsive device 49 which comprises a diaphragm 54 for defining a pair of chambers 52 and 53 at the opposite sides thereof.

The diaphragm 54 is secured to a first valve member 55 which co-operates with the inlet port 50 of the chamber 48. A spring 56 is provided in the chamber 53 which is defined at the side of the diaphragm 54 opposite to the valve chamber 48 so as to normally force the valve member 55 toward the inlet port 50 of the chamber 48. The chamber 53 is connected through a line 67 having a second air flow control valve device 1 therein with the engine intake manifold 11.

As shown in FIG. 2, the second air flow control device 1 includes a hollow main housing 2 having an open end to which an end cap 3 is secured. A diaphragm 4 is disposed between the main housing 2 and the end cap 3 to define a chamber 9 in the cap 3. The main housing 2 is provided with a radial partition 10 for dividing the interior of the main housing 2 into chambers 8 and 66.

The main housing 2 is provided with a suction pressure inlet 12 which is adapted to be connected with the chamber 8 through an air filter 17, and an outlet 13 which is adapted to be connected with the chamber 53 of the pressure-responsive device 49 in the first air flow control valve device 65. The outlet 13 is connected through a passage 39 and a port 16 with the chamber 66. An annular valve seat 32 is defined around the port 16.

The main housing 2 has a cylindrical outer wall 29 and an annular or cylindrical inner wall 30 at the side of the partition 10 opposite to the end cap 3. In the annular space defined between the outer and inner walls 29 and 30, there is disposed a filter element 43 and an end closure 46 is secured to the open end of the outer wall 29.

As shown in FIG. 2, the inner wall 30 is formed with a longitudinal slot 31 and the end closure member 46 secured to the open end of the outer wall 30 has a cut-off portion in the inner surface thereof to form an air passage 45 for establishing communication between the outside of the valve 1 and the chamber 66 through the filter 43 and the slot 31. The end closure member 46 is also formed at the inner surface thereof with inwardly directed projections 47 which engage the adjacent end of the filter 43 to hold the filter in position.

In the chamber 66, there is disposed a valve member 33 for co-operation with the valve seat 32. A screw retainer 41 is secured to the terminal end of the inner wall 30 of the main housing 2 by suitable means such as welding and has an axially extending threaded hole 40. The threaded hole 40 receives an adjusting screw 42 which has an externally threaded portion for engagement with the threaded hole 40 in the screw retainer 41. The adjusting screw 42 carries a spring seat 34 and a compression spring 35 is disposed between the spring seat 34 and the valve member 33 to force the valve member 33 against the spring seat 32 to close the port 16.

The partition 10 is also formed with a boss 14 which extends into the chamber 8 and has an axial passage 15 connecting the chamber 8 with the outlet 13 and the passage 39. The diaphragm 4 carries a time delay device comprising a pressure plate 6 and a check valve body 7 which are secured to the diaphragm 4 by suitable means. The pressure plate 6 has a chamber 5 formed therein and a radial passage 24 connecting the chamber 5 with the chamber 8. The pressure plate 6 is further formed with an elongated valve actuating projection 36 which is adapted to be inserted into the passage 15 with a small clearance therebetween. The projection 36 is formed with an axial passage 38 which opens at one end to the chamber 5 and at the other end to the passage 39.

Between the pressure plate 6 and the check valve body 7, there are formed radial passages 25 which are connected on one hand with the chamber 5 and on the other hand with axial passages 26 formed in the check valve body 7. The passages 26 open to the end face of the check valve body 7 facing to the chamber 9.

A check valve member 22 having a flexible disc 21 is mounted on the check valve body 7 in such a position that the disc 21 co-operates with the end face of the check valve body 7 facing to the chamber 9, by inserting a leg portion 20 formed integrally therewith into a corresponding axial bore in the check valve body 7. Thus, the axial passages 26 are normally closed by the disc 21 of the check valve member 22. The check valve body 7 is formed at the end face facing to the chamber 9 with a narrow orifice passage 28 extending from one of the passages 26 to the circumferential edge of the check valve body 7 that is not covered by the disc 21. Thus, in normal position, the chamber 9 is connected with the chamber 5 only through the orifice 28 but the passages 26 are opened to the chamber 9 when the pressure in the chamber 5 is increased to a value sufficient to make the disc 21 to deflect away from the adjacent end face of the check valve body 7.

In the chamber 8, there is disposed a compression spring 18 which acts between the partition 10 and the pressure plate 6 to force the pressure plate 6 and the check valve body 7 toward the chamber 9. The end cap 3 is formed at its inner wall surface with a plurality of axially extending ribs 19 and 19' which form, by their ends adjacent to the check valve body 7, stop means for preventing further upward movement of the pressure plate 6 and the check valve body 7.

In operation, the engine intake vacuum is introduced from the intake manifold 11 through the inlet 12 and the filter 17 of the second air flow control valve device 1 into the chamber 8. The engine intake vacuum is then transmitted from the chamber 8 through the passage 24 into the chamber 5. In normal accelerating operation of the engine 58, the intake vacuum is not sufficiently low to cause the diaphragm 4 to deflect downwardly against the influence of the spring 18. The pressure in the chamber is gradually transmitted through the passages 25 and 26 and the orifice 28 into the chamber 9. Therefore, during normal accelerating operation of the engine, the pressure in the chamber 9 is considered as being substantially equal to that in the chamber 8. This means that there is no pressure change in the intake manifold sufficient to create the pressure difference, which causes the diaphragm 4 to deflect downwardly between the chambers 8 and 9.

The pressure in the chamber 5 of the pressure plate 6 is further transmitted through the passages 38 and 39, the outlet 13 of the second air flow control device 1 and the passage 67 to the chamber 53 of the pressure-responsive device 49 in the first air flow control device 65 to draw the diaphragm 54 downwardly against the influence of the spring 56. Thus, the valve member 55 is shifted downwardly away from the inlet port 50 so that the auxiliary air is allowed to flow from the pump 59, through the inlet port 50 into the chamber 48, and then through the outlet port 51 and the passage 60 into the exhaust gas reactor 62. Therefore, unburnt noxious constituents in the exhaust gas such as CO and HC are caused to burn in the reactor 62. As well known in the art, catalyst may be used in the exhaust passage 61 to facilitate oxidation of such unburnt constituents.

When engine throttle valve is widely opened for high speed and heavy load operation, the engine intake vacuum is relatively decreased as compared with that in normal accelerating operation of the engine. The relative decrease in the engine intake vacuum is then transmitted through the second air flow control valve device 1 to the chamber 53 of the pressure responsive device 49 in the first auxiliary air flow control valve device 65. Thus, the diaphragm 54 is shifted upwardly under the action of the spring 56 to bring the valve member 55 to the position in which the inlet port 50 is closed. In this manner, the supply of auxiliary air to the reactor 62 is interrupted during high speed and heavy load operation of the engine 58 so as to prevent explosive combustion of unburnt constituents in the engine exhaust gas in the exhaust gas reactor, which may otherwise be experienced during high speed and heavy load operation of the engine due to increase in the amount of such unburnt constituents in such an operating conditions. The inlet port 50 of the first air flow control valve device 65 is kept closed throughout the high speed and heavy load operation of the engine by the biasing force of the spring 56.

When the engine throttle valve is suddenly closed for rapid deceleration, there is a remarkable increase in the engine intake vacuum. The increase in the engine intake vacuum is then immediately transmitted through the inlet 12 and the filter 17 into the chamber 8 of the second air flow control valve device 1. Thus, the diaphragm 4 is drawn downwardly against the function of the spring 18.

The downward deflection of the diaphragm 4 causes corresponding downward movement of the pressure plate 6 against the biasing force of the spring 18. Thus, the projection 36 formed integrally with the pressure plate 6 is brought into engagement with the valve member 33 to force the valve member 33 away from the valve seat 32 against the influence of the spring 35 and, at the same time, to close the passage 38 formed in the projection 36. The atmospheric pressure in the chamber 66 is thus allowed to flow into the passage 39 through the port 16, and then through the outlet 13 of the second air flow control valve device 1 and the passage 67 into the chamber 53 to increase the pressure therein to the valve 65 sufficient to force the diaphragm 54 and thus the valve member 55 upwardly to close the inlet port 50.

In the second flow control valve device 1, the spring 18 in the chamber 8 continuously urges the pressure plate upwardly. However, since there is a resistance provided by the restricted flow passage of the orifice 28, the diaphragm 4, the pressure plate 6 and the check valve body 7 can be returned only gradually to the upper position. Thus, after a certain time delay, they are returned to the upper position by assistance of the urging force of the spring 18 and the projection 36 is disengaged from the valve member 33. Therefore, the atmospheric pressure in the chamber 66 is prevented from entering the passage 39 and the engine intake vacuum is again allowed to pass into the chamber 53 in the first air flow control valve device 65 so as to displace the diaphragm 54 and thus the valve member 55 downwardly to open the inlet port 50. The auxiliary air from the pump 59 is thus again allowed to flow into the exhaust reactor 62. In this manner, the air flow control means serves to interrupt the supply of auxiliary air to the exhaust gas reactor for a certain time during the initial period of the engine deceleration.

From the above description, it will be apparent that the present invention provides auxiliary air flow control means for automobile engine exhaust gas cleaning means, in which the supply of auxiliary air is momentarily interrupted for a certain time during initial period of rapid deceleration of engine, and further the supply of auxiliary air is interrupted throughout the high speed and heavy load operation of the engine.

The invention has thus been shown and described with reference to a preferred embodiment, however, it should be noted that the invention is in no way limited to the details of the illustrated structures but changes and modifications may be made without departing from the scope of the appended claims.

We claim:

1. In an automobile engine utilizing an intake manifold and exhaust gas cleaning means which comprises an auxiliary air supply source for supplying auxiliary air through auxiliary air passage means and auxiliary air flow control means therein to an exhaust system of the automobile engine for effecting oxidation of unburnt constituents in engine exhaust gas, air flow control valve means for actuating said auxiliary air flow control means to permit the supply of auxiliary air flow to the exhaust gas cleaning means comprising:
- a housing having chamber means therein, said housing being provided with a first inlet port communicating said chamber means with said engine intake manifold;
- a second inlet port for introducing atmospheric pressure into an outlet port communicating said chamber means with said auxiliary air flow control means;
- means housed in said chamber means in response to the engine intake pressure for moving from a normally unactuated position to an actuated position for interrupting the supply of said engine intake pressure from the first inlet port to the outlet port; valve means disposed between said second inlet port and said outlet port for normally closing the former;
- valve actuating means for opening said normally closed valve means in response to the engine intake pressure level from said first inlet port;
- said intake pressure responsive means including a diaphragm defining in said chamber means a first chamber and a second closed chamber, said first chamber being connected with said first inlet port and said outlet port;
- said diaphragm carrying said valve actuating means which comprises a hollow projecting member;
- said hollow projecting member being adapted to cooperate with said normally closed valve means to shift the same apart from the second inlet port when the diaphragm is deflected under the influence of the engine intake pressure; and
- aperture means communicating said first chamber through the hollow interior of the projecting member with the outlet port, whereby when the projecting member engages said normally closed valve means to shift the same from the second inlet port, said communication of the first chamber with the outlet part through the hollow interior of the projecting member is interrupted and at the same time the atmospheric pressure is introduced into the outlet port from the second inlet port.

2. In an automobile engine utilizing an intake manifold and exhaust gas cleaning means which comprises an auxiliary air supply source for supplying auxiliary air through auxiliary air passage means to an exhaust system of the automobile engine for effecting oxidation of unburnt constituents in engine exhaust gas, auxiliary air flow control means comprising first auxiliary air flow control valve means disposed in said auxiliary air passage means and including a valve member for closing the auxiliary air passage means to interrupt the air supply to the exhaust system, and pressure-responsive means for controlling said valve member, intake pressure passage means connecting said intake manifold with said pressure-responsive means, said pressure-responsive means capable of being subjected to engine intake pressure and atmospheric pressure for actuating said valve member to open and closed positions in response to the engine intake pressure and atmospheric pressure, and second air flow control valve means disposed within the intake pressure passage means for controlling the supply of said engine intake and atmospheric pressures to the pressure-responsive means in the first control valve means, said second flow control valve means including means responsive to the engine intake pressure for moving from a normally unactuated position to an actuated position for interrupting the supply of said engine intake pressure to the first pressure-responsive means of said first air flow control valve means, port means formed in said intake pressure passage means opening the passage means to atmosphere, valve means for normally closing said port means, valve-actuating means for opening said normally closed valve means in response to the actuation of the engine intake pressure-responsive means of the second control valve means, and time delay means disposed in said engine intake pressure-responsive means of the second control valve means for returning the same to its normally unactuated position after a certain time delay, said valve member of said first control valve means being opened to allow the supply of the auxiliary air to the said auxiliary air passage when the engine intake vacuum is over a first predetermined value which is slightly less than the engine intake vacuum during the normal operating condition of the engine, and said pressure-responsive means of said second control valve being actuated to interrupt the engine intake pressure to said pressure-responsive means in said first control valve means for a certain time when the engine intake vacuum is over a second predetermined value which is slightly lower than engine intake vacuum during rapid closure of the engine throttle under the high speed and heavy load operation of the engine, said engine intake pressure-responsive means of said second control valve means including a diaphragm for urging said normally closed valve means against a bias force to open said port means when the engine intake vacuum increases over said second predetermined value so that the atmospheric pressure is introduced into the pressure-responsive means in the first control valve means to close said auxiliary air passage means, said diaphragm defining in said second control valve means a first chamber connected with said engine intake pressure passage means and a closed second chamber, said time delay means including check valve means carried by the diaphragm and constructed for permitting free flow of air from the first chamber to the second chamber but allowing only a limited flow of air in the opposite direction, said diaphragm carrying said valve actuating means which comprises a hollow projecting member which is adapted to cooperate with said normally closed valve means to shift the same apart from the port means when the diaphragm is deflected under the influence of the engine intake pressure below the second predetermined value, and aperture means communicating said first chamber through the hollow interior of the projecting member with the pressure-responsive means in the first control valve means, whereby when the projecting member engages said normally closed valve means to shift the same from the port means, said communication of the first chamber with the pressure-responsive means through the hollow interior of the projecting member is interrupted.

* * * * *